(12) United States Patent (10) Patent No.: US 8,619,282 B2
Liu et al. (45) Date of Patent: Dec. 31, 2013

(54) IMAGE FORMING SYSTEM AND COMPUTER READABLE MEDIUM STORING PROGRAM

(75) Inventors: Bo Liu, Kanagawa (JP); Masahiko Yajima, Kanagawa (JP); Hirokazu Tanaka, Kanagawa (JP); Katsuhito Habaguchi, Kanagawa (JP); Takashi Kikumoto, Kanagawa (JP); Masayuki Iwasawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 203 days.

(21) Appl. No.: 13/198,041

(22) Filed: Aug. 4, 2011

(65) Prior Publication Data

US 2012/0250067 A1 Oct. 4, 2012

(30) Foreign Application Priority Data

Mar. 29, 2011 (JP) ................................ 2011-072480

(51) Int. Cl.
*G06F 15/00* (2006.01)
(52) U.S. Cl.
USPC ........................................................ 358/1.14
(58) Field of Classification Search
USPC ............................... 358/1.13, 1.15
See application file for complete search history.

(56) References Cited

U.S. PATENT DOCUMENTS 7,630,985 B2 12/2009 Sunada
2011/0228311 A1* 9/2011 Oguma et al. ............... 358/1.14

FOREIGN PATENT DOCUMENTS

JP A-2002-370407 12/2002
JP A-2004-220354 8/2004

* cited by examiner

*Primary Examiner* — Saeid Ebrahimi Dehkordy
(74) *Attorney, Agent, or Firm* — Oliff & Berridge, PLC

(57) ABSTRACT

An image forming system includes an information management unit, at least one image forming unit, an authenticating unit, a determining unit, an adding unit, a notifying unit, and a controller. The information management unit stores and manages print information. Each image forming unit forms an image on a recording medium in accordance with the print information. The authenticating unit authenticates a recipient of an output result of the image forming unit. The determining unit determines whether or not the print information requires authentication. The adding unit adds authentication information about the recipient to the print information when the print information requires authentication. The notifying unit notifies the recipient of information regarding the print information with the authentication information added. The controller controls the information management unit to transmit the print information to the image forming unit to form an image when the recipient has been successfully authenticated.

6 Claims, 10 Drawing Sheets

FIG. 4

| AUTHENTICATED USER ID | DATA FORMAT |
|---|---|
| USER A | LCDS |
| USER B | PS |
| USER B | PDF |

FIG. 5

| AUTHENTICATED USER ID | NOTIFICATION METHOD | FORWARDING DESTINATION |
|---|---|---|
| USER A | E-mail | usrA@aaa.co.jp |
| USER B | MESSAGE | 129.249.109.1 |

FIG. 6

To : usrA@aaa.co.jp
From : printsvr@aaa.co.jp
Subject : NOTIFICATION OF RECEIPT
OF AUTHENTICATION JOB The received job is as follows.
Format : LCDS
Server arrival time: 01/20/2010 13:30:50

FIG. 8

| PRINT JOB DATA JOB | 1 |
|---|---|
| FORMAT | LCDS |
| COLOR PRINTING | NOT REQUIRED |
| POST-PROCESSING | REQUIRED |
| JOB PRIORITY | HIGH |

FIG. 9

To : usrA@aaa.co.jp
From : printsvr@aaa.co.jp
Subject : NOTIFICATION OF RECEIPT OF AUTHENTICATION JOB The basic information about the received job is as follows.

Format         : LCDS
Color Printing : Not required
Post-processing : Required
Job priority   : High
Server arrival time : 01/20/2010 13:30:50

FIG. 11

|  | PRINT DATA | PRINTER |
|---|---|---|
| SENDER SIDE | BASIC INFORMATION ABOUT PRINT DATA<br>→ FORMAT<br>→ DATA CONFIGURATION<br>→ PRIORITY<br>→ RECEIVER CARD ID<br>→ RECEIVER CONTACT | |
| SERVER SIDE | — | BASIC CONFIGURATION OF EACH PRINTER<br>→ PRINTER TYPE<br>→ DATA FORMAT SUPPORTED BY PRINTER<br>→ POST-PROCESSING CONFIGURATION OF PRINTER<br>→ PLACE WHERE PRINTER IS INSTALLED<br>→ STATUS OF JOBS RECEIVED BY PRINTER |
| RECEIVER SIDE | — | CARD FOR AUTHENTICATION |

FIG. 12

| PRINTER INFORMATION | 1 | 2 | 3 |
|---|---|---|---|
| NAME OF PRINTER | MULTI-FUNCTION MACHINE PR1 | CONTINUOUS FORM PRINTER PR2 | MULTI-FUNCTION MACHINE PR3 |
| DATA FORMAT SUPPORTED | PS<br>PDF<br>PLW | PS<br>PDF<br>LCDS<br>PLW<br>IPDS | PS<br>PDF<br>PLW<br>LCDS |
| MONOCHROME/ COLOR COPYING | MONOCHROME | COLOR | COLOR |
| POST-PROCESSING CONFIGURATION | YES | NO | YES |
| INSTALLATION PLACE | 16FSE | 2F | 15F |
| STATUS | AVAILABLE | NOT AVAILABLE | AVAILABLE |
| QUEUED JOB STATUS | TWO JOBS | ZERO JOBS | ZERO JOBS |

FIG. 13

To : usrA@aaa.co.jp
From : printsvr@aaa.co.jp
Subject : NOTIFICATION OF TRANSMISSION
OF AUTHENTICATION JOB The basic information about the received
job is as follows.

Format : LCDS

Server arrival time : 01/20/2010 13:30:50

Information about printers available is
as follows.

1. Name of Printer : Multi-Function Machine PR3

Installation place : 15F

IMAGE FORMING SYSTEM AND COMPUTER READABLE MEDIUM STORING PROGRAM

CROSS-REFERENCE TO RELATED APPLICATIONS

This application is based on and claims priority under 35 USC 119 from Japanese Patent Application No. 2011-072480 filed Mar. 29, 2011.

BACKGROUND (i) Technical Field

The present invention relates to an image forming system and a computer readable medium storing a program.

(ii) Related Art

Recently, secure printing systems (or authentication printing systems) for use with image forming apparatuses such as printers have become increasingly prevalent. In secure printing systems, in order to avoid unwanted errors such as leakage of information due to a printed document being left behind and a printed document gone missing due to a mix-up, user identity authentication may be performed on a printer using an integrated circuit (IC) card or the like and only an authenticated user executes printing.

SUMMARY

According to an aspect of the invention, there is provided an image forming system including an information management unit, at least one image forming unit, an authenticating unit, a determining unit, an adding unit, a notifying unit, and a controller. The information management unit receives print information via a communication unit, and stores and manages the print information. Each of the at least one image forming unit forms an image on a recording medium in accordance with the print information acquired from the information management unit via the communication unit. The authenticating unit authenticates a recipient who is to receive an output result obtained by the at least one image forming unit. The determining unit determines whether or not the print information is print information that requires authentication performed by the authenticating unit on the basis of a condition set in advance in the print information. The adding unit adds authentication information about the recipient who is to receive the output result that is based on the print information to the print information when the determining unit determines that the print information is print information that requires the authentication performed by the authenticating unit. The notifying unit notifies the recipient of information regarding the print information to which the adding unit has added the authentication information. The controller controls the information management unit to transmit the print information to the at least one image forming unit to form an image when the authenticating unit has successfully authenticated the recipient on the basis of the notification provided by the notifying unit.

BRIEF DESCRIPTION OF THE DRAWINGS

Exemplary embodiment(s) of the present invention will be described in detail based on the following figures, wherein:

FIG. 4 is a table illustrating an example of an authentication map stored in a print server;

FIG. 5 illustrates an example of a table of user IDs and notification methods;

FIG. 6 illustrates an example of a notification message;

FIG. 8 illustrates an example of print data basic information;

FIG. 9 illustrates an example of a notification message;

FIG. 11 illustrates an example of an information table;

FIG. 12 illustrates an example of the basic configuration of printers; and

FIG. 13 illustrates an example of a notification message.

DETAILED DESCRIPTION

Figure 1:
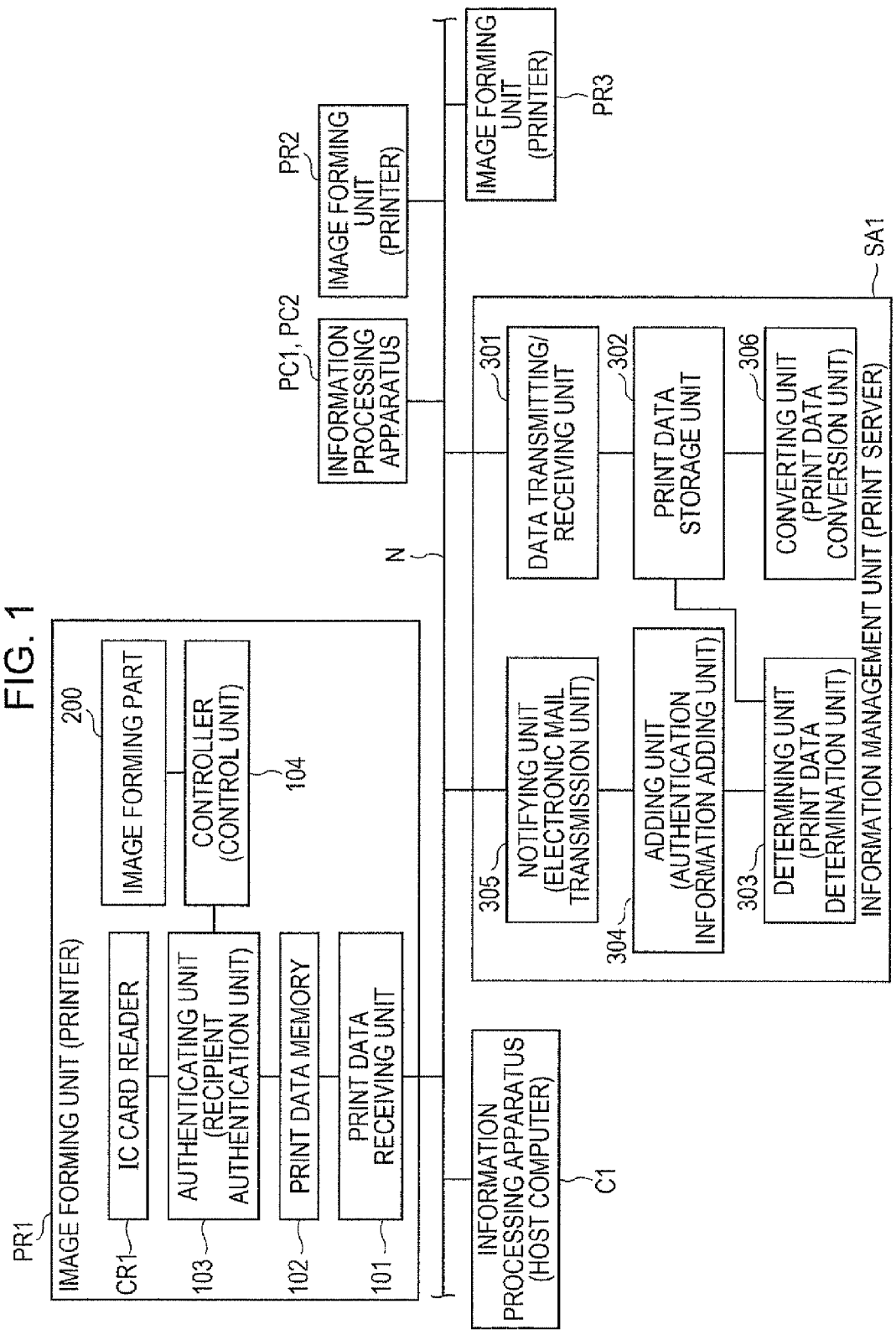
FIG. 1 is a functional block diagram illustrating the functional configuration of an image forming system according to an exemplary embodiment.

An exemplary embodiment of the present invention will be described in detail with reference to the drawings. In the drawings, the same members or substantially the same members are assigned the same numerals, and will not be described redundantly. The exemplary embodiment of the present invention discussed herein is merely illustrative, and the present invention is not intended to be limited to the following exemplary embodiment.

An image forming system PS1 according to an exemplary embodiment of the present invention will be described with reference to FIGS. 1 to 13.

The functions of the image forming system PS1 will be described with reference to function blocks illustrated in FIG. 1.

The image forming system PS1 includes a print server SA1 (an example of an information management unit), three printers PR1, PR2, and PR3 (examples of image forming units), and a host computer C1. The print server SA1 receives print data (print information) via a network N (an example of a communication unit) such as a local area network (LAN), a wide area network (WAN), or the Internet, and stores and manages the print data. Each of the three printers PR1, PR2, and PR3 forms an image on a recording medium such as a sheet of printing paper on the basis of print data acquired from the print server SA1 via the network N. The host computer C1 generates print data, and transmits the print data to the print server SA1. Personal computers PC1 and PC2 each serving as an information processing apparatus that transmits and receives an electronic mail described below are also connected to the network N.

In FIG. 1, the three printers PR1, PR2, and PR3 are connected, by way of example. However, one printer or more than three printers may be connected.

In this exemplary embodiment, the printers PR1 and PR3 among the printers PR1, PR2, and PR3 have similar configurations. However, the printers PR1, PR2, and PR3 support different data formats (see FIG. 12).

The printers PR1 and PR3 may be, but not be limited to, multi-function machines having a scanner function and other suitable functions, and the printer PR2 may be, but not be limited to, a continuous form printer.

FIG. 1 illustrates the functional configuration of the printer PR1.

The printer PR1 includes a print data receiving unit 101 and a print data memory 102. The print data receiving unit 101 receives print data from the print server SA1. The print data memory 102 stores the received print data, and may be, for example, a hard disk device.

The printer PR1 further includes a recipient authentication unit 103 (an example of an authenticating unit) and a control unit 104 (an example of a controller). The recipient authentication unit 103 authenticates a recipient who is to receive an output result (printed matter). When the recipient authentication unit 103 has successfully authenticated the recipient on the basis of a notification sent from an electronic mail transmission unit 305 described below, the control unit 104 controls the print server SA1 to transmit print data to the printer PR1 and controls an image forming part 200 such as a print engine to form an image. The control unit 104 may be, for example, a microcomputer.

The recipient authentication unit 103 includes an IC card reader CR1 that reads ID data or similar data from an IC card owned by the recipient.

As described above, the printer PR3 also has a configuration similar to that of the printer PR1.

The print server SA1 includes a data transmitting and receiving unit 301 and a print data storage unit 302. The data transmitting and receiving unit 301 may receive print data from the host computer C1, and may transmit print data and other suitable data to the printers PR1 to PR3. The print data storage unit 302 stores received print data, and may be, for example, a hard disk device.

The print server SA1 further includes a print data determination unit 303 (an example of a determining unit), an authentication information addition unit 304 (an example of an adding unit), the electronic mail transmission unit 305 (an example of a notifying unit), and a print data conversion unit 306 (an example of a converting unit). The print data determination unit 303 determines, based on conditions set in advance for print data (for example, conditions based on information such as the attribute of the print data), whether or not the print data is print data that requires authentication performed by the recipient authentication unit 103 provided in the printer PR1 or PR3, described above. If the print data determination unit 303 determines that the print data is print information that requires the authentication, the authentication information addition unit 304 adds authentication information about the recipient who is to receive the output result (printed matter) that is based on the print data to the print data. The electronic mail transmission unit 305 notifies the recipient of information regarding the print data (for example, information such as the job name, the amount of data, and the format) to which the authentication information addition unit 304 has added the authentication information. Upon receipt of a print request, the print data conversion unit 306 converts the print data in accordance with the printer (one of the printers PR1 to PR3) that has sent the print request.

In the example illustrated in FIG. 1, the electronic mail transmission unit 305 is used as an example of the notifying unit; however, this is merely an example. The notifying unit may be configured to provide the recipient with notification by transmitting a message or the like to a specified IP address (see FIG. 5).

Next, an example of the operation of the image forming system PS1 will be described with reference to FIG. 2.

First, the print server SA1 receives a print job (print data) from the host computer C1, and stores the print job in the print data storage unit 302.

Then, the print data determination unit 303 checks whether or not the print data is a job that requires authentication based on an IC card, that is, whether or not the print data includes authentication information, in accordance with the conditions such as the attribute of the print data.

If it is determined that the print data is a job that requires authentication based on an IC card, the authentication information addition unit 304 adds authentication information about the user who is to receive the print job (print data) to the print job (print data).

Then, the electronic mail transmission unit 305 notifies the user who is to receive the print job (print data) of job information.

After that, the recipient performs authentication on one of the printers PR1 to PR3. The print server SA1 holds the print job (print data) without transmission until the print server SA1 has received a print request command from the printer on which the recipient has performed authentication.

If it is determined that the print data is not a job that requires authentication based on an IC card, the print server SA1 holds the print job (print data) as it is.

Figure 2:
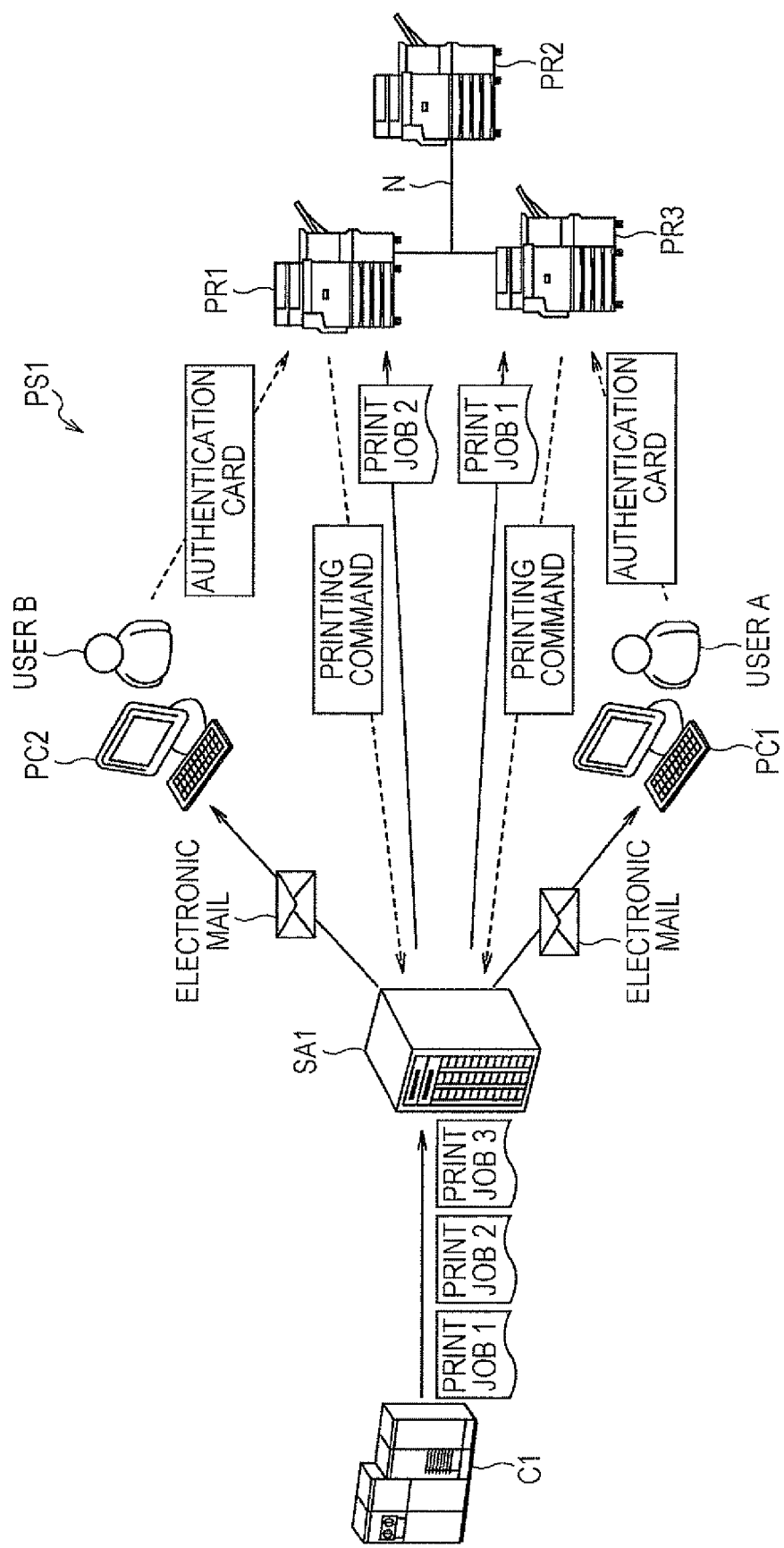
FIG. 2 illustrates an overview of the operation of the image forming system according to the exemplary embodiment.

More specifically, for example, referring to FIG. 2, since a print job 1 is a print job addressed to a user A. In this case, the ID (authentication information) of the user A is added to the print job before the print job is transmitted to the user A.

After that, the print server SA1 holds the print job until the print server SA1 has received a job processing request command (printing command) from the printer (one of the printers PR1 to PR3) on which authentication based on the IC card (authentication card) owned by the user A has been performed.

Upon receipt of a printing command, the print data conversion unit 306 performs a data conversion process in accordance with the printer that has sent the printing command, and transfers the print data to the printer.

If the print data is a print job 2, since the print job 2 is a print job addressed to a user B, the ID (authentication information) of the user B is added to the print job before the print job is transmitted to the user B.

After that, the print server SA1 holds the print job until the print server SA1 has received a job processing request command (printing command) from the printer on which authorization based on the IC card (authentication card) owned by the user B has been performed.

Upon receipt of a printing command, the print data conversion unit 306 performs a data conversion process in accordance with the printer that has sent the printing command, and transfers the print data to the printer.

If the print data is a print job 3, it is determined that the print data is not a job that requires authentication based on an IC card. In this case, the print server SA1 holds the print data as it is. Upon receipt of a printing command, the print data conversion unit 306 performs a data conversion process in accordance with the printer that has sent the printing command, and transfers the print data to the printer.

Therefore, the recipient is notified of information regarding print data, and the print data is printed and output when the recipient has been successfully authenticated on the basis of the notification. Even if the sender of print information and the recipient of an output result are different from each other, printing efficiency may be improved without performing a time-consuming operation.

In the exemplary embodiment illustrated in FIG. 2, by way of example, the personal computers PC1 and PC2 operated by the users A and B, respectively, receive electronic mails. However, this is merely illustrative, and the mobile terminals or other suitable devices owned by the users A and B may receive electronic mails.

Figure 3:
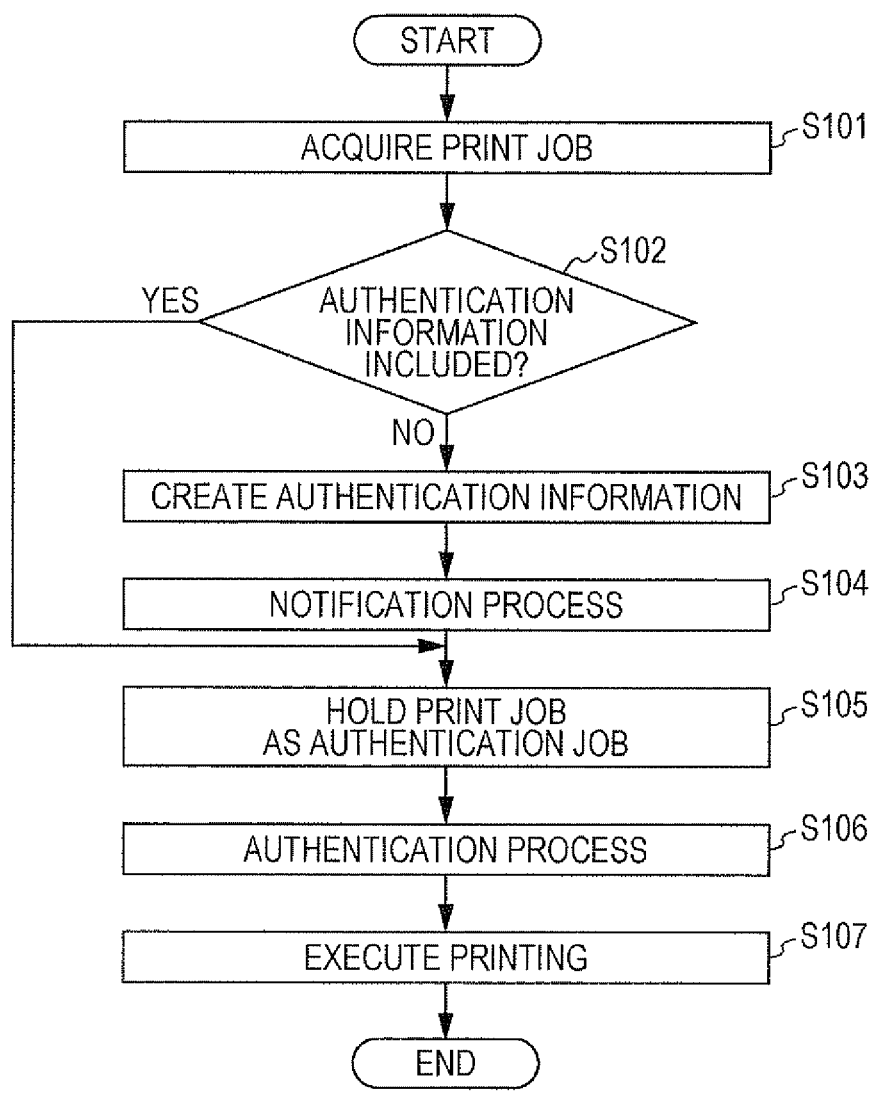
FIG. 3 is a flowchart illustrating a processing procedure of a printing process.

Next, an example of a processing procedure of a printing process executed by the image forming system PS1 will be described with reference to a flowchart of FIG. 3.

In step S101, the print server SA1 receives a print job (print data). In step S102, it is determined whether or not the print job is an authentication job.

If "YES" is determined, the process proceeds to step S105. If "NO" is determined, the process proceeds to step S103.

In step S103, authentication information is created and is added to the print job. Then, the process proceeds to step S104.

In step S104, the recipient is notified of the job information via electronic mail. Then, the process proceeds to step S105.

In step S105, the print server SA1 holds the print job as an authentication job. Then, the process proceeds to step S106.

In step S106, the process of authenticating the recipient is performed in accordance with the procedure illustrated in FIG. 2. If the recipient has been successfully authenticated, the process proceeds to step S107. In step S107, the printer prints the authentication job, and then the process ends.

FIG. 4 illustrates an example of an authentication map stored in the print server SA1.

In the illustrated example, the users A and B are authenticated using the data formats (line-conditioned data stream (LCDS), PostScript (PS), and portable document format (PDF)) of the print data. That is, it is determined based on the data format whether or not authentication information is included.

Here, LCDS is a data format developed by Xerox Corporation. Due to its specifications, LCDS includes no authentication information, and therefore "NO" is determined in step S102, by way of example.

FIG. 5 illustrates an example of a table representing the relationship between authenticated user IDs and notification methods.

In the illustrated example, the notification method for the user A is electronic mail (E-mail), and the mail address of the user A is stored as the forwarding destination.

The notification method for the user B is the use of a message, and the Internet Protocol (IP) address of the user B is stored as the forwarding destination.

FIG. 6 illustrates an example of a notification message.

The illustrated message informs, for example, the user A that a print job having the "LCDS" format, which is addressed to the user A, is stored in the print server SA1 at the presented time. After that, the user A goes to the desired printer (one of the printers PR1 to PR3) and performs the authentication operation.

Figure 7:
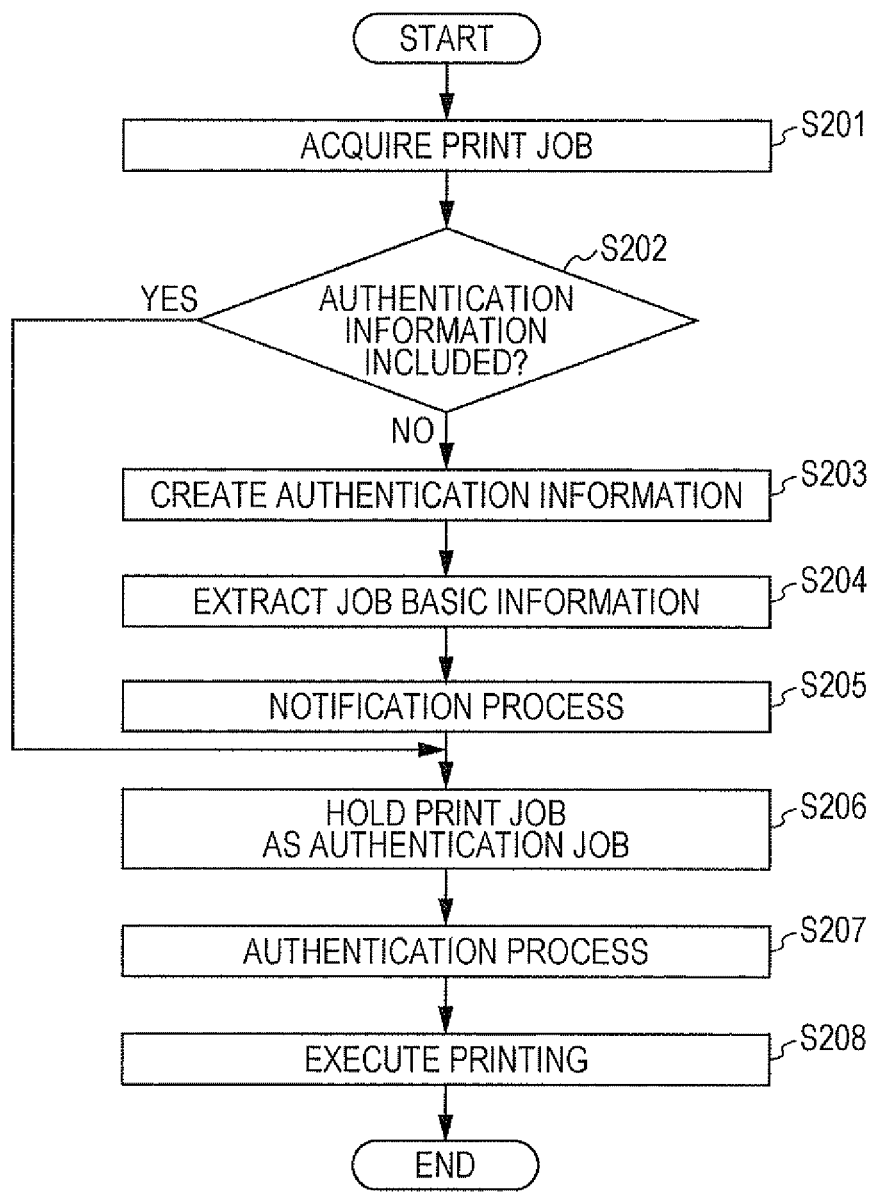
FIG. 7 is a flowchart illustrating of another processing procedure of the printing process.

Next, another processing procedure of the printing process will be described with reference to a flowchart of FIG. 7.

In step S201, the print server SA1 receives a print job (print data). In step S202, it is determined whether or not the print job is an authentication job.

If "YES" is determined, the process proceeds to step S206. If "NO" is determined, the process proceeds to step S203.

In step S203, authentication information is created and is added to the print job. Then, the process proceeds to step S204.

In step S204, basic information about the print job (print data) is extracted.

FIG. 8 illustrates an example of basic information about print data. In the illustrated example, the format is LCDS, color printing is not required, post-processing is required, and the job priority is high.

Then, in step S205, the recipient is notified of the job information via electronic mail. Then, the process proceeds to step S206.

In step S206, the print server SA1 holds the print job as an authentication job. Then, the process proceeds to step S207.

In step S207, the process of authenticating the recipient is performed in accordance with the procedure illustrated in FIG. 2. If the recipient has been successfully authenticated, the process proceeds to step S208. In step S208, the printer prints the authentication job, and then the process ends.

FIG. 9 illustrates an example of a notification message.

The examples illustrated in FIGS. 4 and 5 may also be applied to the example illustrated in FIG. 9.

The illustrated message informs, for example, the user A that a print job having the basic information described above, which is addressed to the user A, is stored in the print server SA1 at the presented time. After that, the user A goes to the desired printer (one of the printers PR1 to PR3), and performs the authentication operation.

Figure 10:
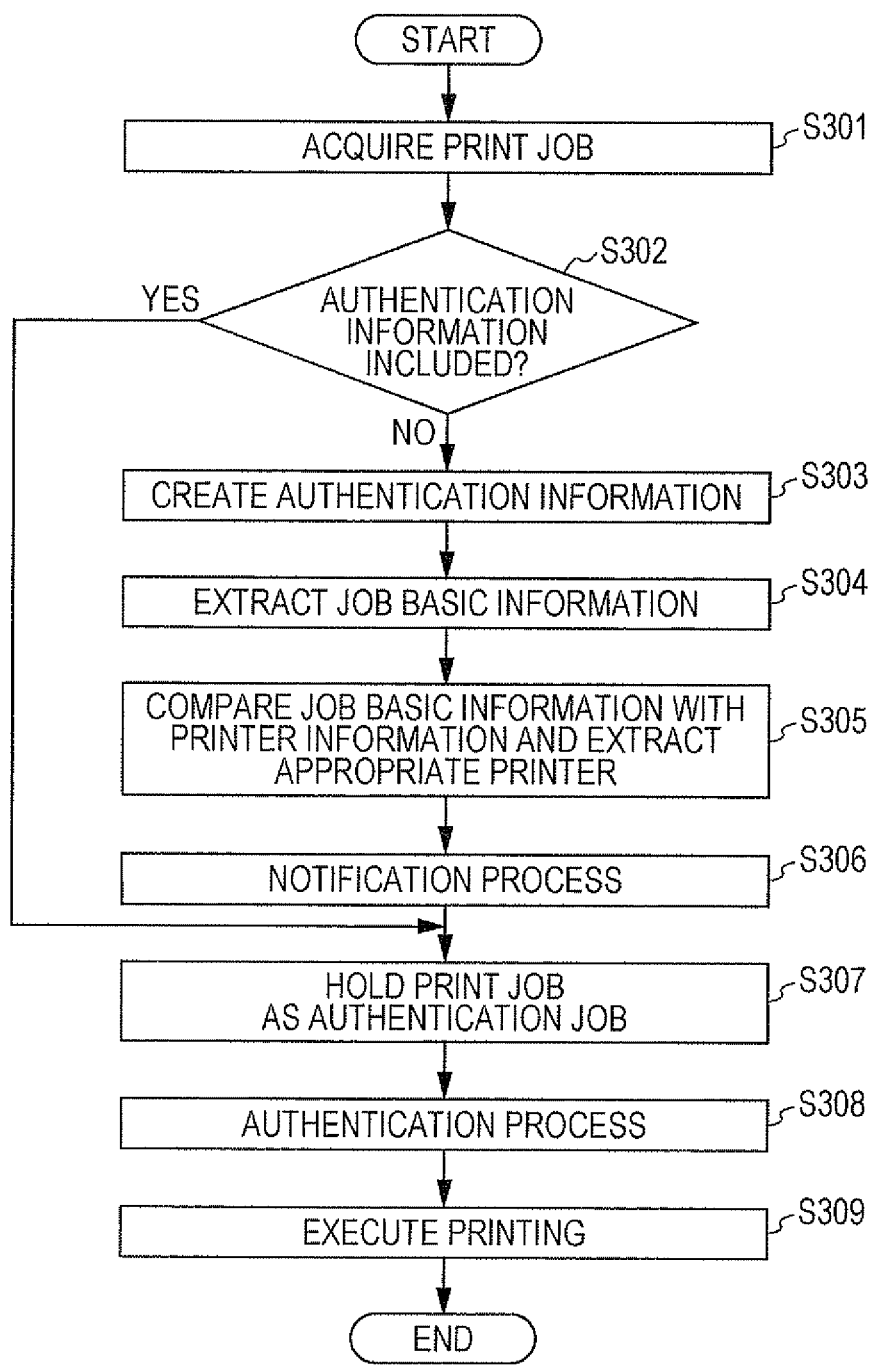
FIG. 10 is a flowchart illustrating another processing procedure of the printing process.

Next, another processing procedure of the printing process will be described with reference to a flowchart of FIG. 10.

In step S301, the print server SA1 receives a print job (print data). In step S302, it is determined whether or not the print job is an authentication job.

If "YES" is determined, the process proceeds to step S307. If "NO" is determined, the process proceeds to step S303.

In step S303, authentication information is created and is added to the print job. Then, the process proceeds to step S304.

In step S304, basic information about the print job (print data) is extracted.

An example of the basic information may be that illustrated in FIG. 8 described above.

Then, in step S305, the basic information is compared with printer information (see FIG. 12), and a printer capable of printing the received print job is extracted. Then, the process proceeds to step S306.

In step S306, the recipient is notified of the job information and information regarding the extracted printer via electronic mail. Then, the process proceeds to step S307.

In step S307, the print server SA1 holds the print job as an authentication job. Then, the process proceeds to step S308.

In step S308, the process of authenticating the recipient is performed in accordance with the procedure illustrated in FIG. 2. If the recipient has been successfully authenticated, the process proceeds to step S309. In step S309, the printer prints the authentication job, and then the process ends.

FIG. 11 illustrates an example of information owned by the sender, the receiver, and the print server SA1.

FIG. 12 illustrates an example of information about the basic configuration of the printers PR1 to PR3.

FIG. 13 illustrates an example of a notification message.

The illustrated message informs, for example, the user A that a print job having the basic information described above, which is addressed to the user A, is stored in the print server SA1 at the presented time, and that printers capable of printing the print job include a multi-function machine (i.e., the printer PR3). The user A is also informed of information about the place where the multi-function machine is installed, and thereafter goes to the printer PR3 to perform the authentication operation.

As described above, the image forming system PS1 according to this exemplary embodiment notifies the recipient of information regarding print data, and prints and outputs the print data when the recipient has been successfully authenticated on the basis of the notification. Even if the sender of print information and the recipient of an output result (printed matter) are different from each other, printing efficiency may be improved without performing a time-consuming operation.

While the invention made by the inventors has been described in detail with reference to an exemplary embodiment thereof, it is to be understood that the exemplary embodiment disclosed herein is merely illustrative in any sense and is not intended to be limited to the technology disclosed herein. That is, the technical range of the present invention is not to be construed in a limiting sense based on the foregoing description of the exemplary embodiment, but should be construed in accordance with the appended claims. Any technology equivalent to that described in the appended claims and any changes made to the appended claims may fall within the scope of the invention.

Furthermore, a program may be provided via a network or may be stored in a recording medium such as a compact disc read-only memory (CD-ROM).

A given program including an image processing program may not necessarily be recorded on a storage device such as a hard disk serving as a recording medium, and may also be provided in the following manner.

For example, the given program may be stored in a ROM, and a central processing unit (CPU) may load the given program into a main memory from the ROM and execute the given program.

The given program may also be stored in a computer-readable recording medium such as a digital versatile disc read-only memory (DVD-ROM), a CD-ROM, magneto-optical (MO) disk, or a flexible disk and may be distributed.

An image forming apparatus, or any other similar apparatus, may be connected to a server device or a host computer via a communication line (for example, the Internet), and may download the given program from the server device or the host computer and then execute the given program. In this case, the given program may be downloaded to a memory such as a random access memory (RAM) or to a storage device (recording medium) such as a hard disk.

An image forming system and a computer readable medium storing a processing program according to exemplary embodiments of the present invention may be used in a high-speed printer, a multi-function machine, or any other suitable apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
   an information management unit that receives print information via a communication unit and that stores and manages the print information;
   at least one image forming unit, each image forming unit being configured to form an image on a recording medium in accordance with the print information acquired from the information management unit via the communication unit;
   an authenticating unit that authenticates a recipient who is to receive an output result obtained by the at least one image forming unit;
   a determining unit that determines whether or not the print information is print information that requires authentication performed by the authenticating unit on the basis of a condition set in advance in the print information;
   an adding unit that adds authentication information about the recipient who is to receive the output result that is based on the print information to the print information when the determining unit determines that the print information is print information that requires the authentication performed by the authenticating unit;
   a relating information storing unit that stores relating information for relating authentication information of the recipient and a destination of notification of the recipient;
   a notifying unit that notifies the recipient of information regarding the print information to which the adding unit has added the authentication information for the destination of recipient related to authentication information of the recipient according to the relating information; and
   a controller that controls the information management unit to transmit the print information to the at least one image forming unit to form an image when the authenticating unit has successfully authenticated the recipient on the basis of the notification provided by the notifying unit.

2. The image forming system according to claim 1, wherein the controller controls the information management unit to hold the print information until the information management unit has received a print request from an image forming unit among the at least one image forming unit after the authenticating unit has performed authentication.

3. The image forming system according to claim 2, further comprising a converting unit that converts the print information, when the information management unit receives a print request, in accordance with an image forming unit that has sent the print request among the at least one image forming unit.

4. The image forming system according to claim 3, wherein the controller controls the information management unit to hold the print information when the determining unit determines that the print information is not print information that requires the authentication performed by the authenticating unit, and
   wherein the controller controls the converting unit to convert the print information, when the information management unit receives a print request from an image forming unit among the at least one image forming unit, in accordance with the image forming unit that has sent the print request, and controls the information management unit to transmit the print information to the image forming unit to form an image.

5. A non-transitory computer readable medium storing a program causing a computer to execute a process for performing processing, the process comprising:
   forming an image on a recording medium in accordance with print information acquired from an information management unit via a communication unit;
   authenticating a recipient who is to receive an output result;
   determining whether or not the print information is print information that requires authentication on the basis of a condition set in advance in the print information;
   adding authentication information about the recipient who is to receive the output result that is based on the print information to the print information when it is determined that the print information is print information that requires authentication;

storing relating information for relating authentication information of the recipient and a destination of notification of the recipient;

notifying the recipient of information regarding the print information to which the authentication information has been added for the destination of recipient related to authentication information of the recipient according to the relating information; and controlling the information management unit to transmit the print information to an image forming unit when the recipient has been successfully authenticated.

6. An image forming system comprising:

a print server that stores and manages print information;

at least one printer, each printer being configured to print and output the print information acquired from the print server via a communication unit on a recording medium; and an information processing apparatus connected to the print server and the at least one printer via the communication unit, the print server including an information management unit that stores and manages print information, an authenticating unit that authenticates a recipient who is to receive an output result obtained by the at least one printer, a determining unit that determines whether or not the print information is print information that requires authentication performed by the authenticating unit on the basis of a condition set in advance in the print information, an adding unit that adds authentication information about the recipient who is to receive the output result that is based on the print information to the print information when the determining unit determines that the print information is print information that requires the authentication performed by the authenticating unit, a relating information storing unit that stores relating information for relating authentication information of the recipient and a destination of notification of the recipient;

a notifying unit that notifies the recipient of information regarding the print information to which the adding unit has added the authentication information for the destination of recipient related to authentication information of the recipient according to the relating information, and a controller that performs control to transmit the print information to the at least one printer to form an image when the authenticating unit has successfully authenticated the recipient on the basis of the notification provided by the notifying unit.

* * * * *